US010512349B2

(12) United States Patent
Wu et al.

(10) Patent No.: US 10,512,349 B2
(45) Date of Patent: Dec. 24, 2019

(54) ELECTRIC WINE DECANTER

(71) Applicant: Wenzhou Sorbo Technology Co., Ltd., Wenzhou, Zhejiang (CN)

(72) Inventors: Jianjun Wu, Zhejiang (CN); Zhanfeng Liu, Zhejiang (CN); Gang Zhou, Zhejiang (CN); Qingbao Lin, Zhejiang (CN)

(73) Assignee: WENZHOU SORBO TECHNOLOGY CO., LTD., Wenzhou, Zhejiang (CN)

( * ) Notice: Subject to any disclaimer, the term of this patent is extended or adjusted under 35 U.S.C. 154(b) by 332 days.

(21) Appl. No.: 15/657,228

(22) Filed: Jul. 24, 2017

(65) Prior Publication Data

US 2018/0055263 A1 Mar. 1, 2018

(30) Foreign Application Priority Data

Aug. 30, 2016 (CN) .......................... 2016 1 0770174

(51) Int. Cl.
| | |
|---|---|
| *A47G 23/02* | (2006.01) |
| *A47J 43/00* | (2006.01) |
| *A47J 47/01* | (2006.01) |
| *A47J 43/04* | (2006.01) |

(52) U.S. Cl.
CPC .......... *A47G 23/0241* (2013.01); *A47J 43/00* (2013.01); *A47J 43/04* (2013.01); *A47J 47/01* (2013.01)

(58) Field of Classification Search
CPC .. A47J 31/00; A47J 43/00; A47J 43/04; A47J 47/01; A47G 23/00; A47G 23/0241

USPC ........ 99/323.1, 468, 472, 277.1, 277.2, 277, 99/275

See application file for complete search history.

(56) References Cited

U.S. PATENT DOCUMENTS

| | | | | |
|---|---|---|---|---|
| 4,494,452 | A * | 1/1985 | Barzso ................ | B01F 3/04794 261/122.1 |
| 7,198,074 | B2 * | 4/2007 | Lemme ................ | B65B 31/047 141/114 |
| 7,726,356 | B2 * | 6/2010 | van der Lande ..... | B65B 31/047 141/60 |
| 8,561,970 | B1 * | 10/2013 | Mills .................... | B01F 13/002 261/124 |
| 8,807,358 | B2 * | 8/2014 | Devoy .................. | B01F 3/0446 215/309 |
| 9,932,976 | B2 * | 4/2018 | Cavatorta .............. | F04B 37/14 |

(Continued)

*Primary Examiner* — Ibrahime A Abraham
*Assistant Examiner* — Chris Q Liu
(74) *Attorney, Agent, or Firm* — Leong C. Lei

(57) ABSTRACT

An electric wine decanter comprises a housing, an air pump, a spout, the retaining base and a control switch. The retaining base is provided with a vent hole for communicating with the air in the wine container and a wine guide tube for extending to a bottom of the wine container. The housing further includes a directional control valve therein for controlling an air flow switch of the air pump and a drive device for controlling the operation of the directional control valve. The directional control valve includes a valve body and a valve seat mounted to a bottom of the valve body. It is only necessary to install the electric wine decanter on the mouth of the wine container. By the opening and closing of the different valve mouths, the flow path of the air flow is changed to realize the functions of pressure-holding, vacuumizing and decanting.

12 Claims, 14 Drawing Sheets

(56) References Cited

U.S. PATENT DOCUMENTS

2009/0108022 A1\* 4/2009 Huggins .............. B67D 3/0041
222/153.04

\* cited by examiner

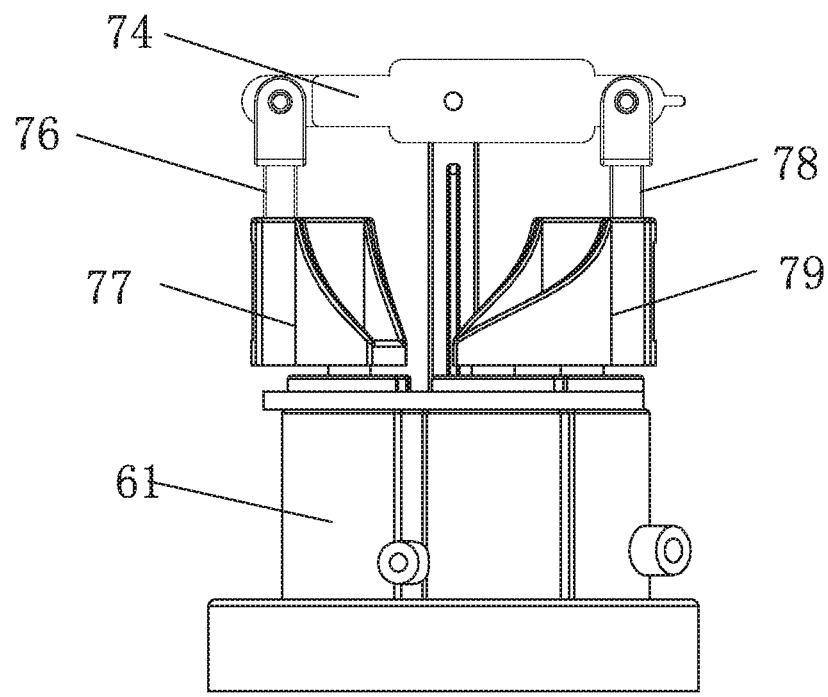
F I G. 12
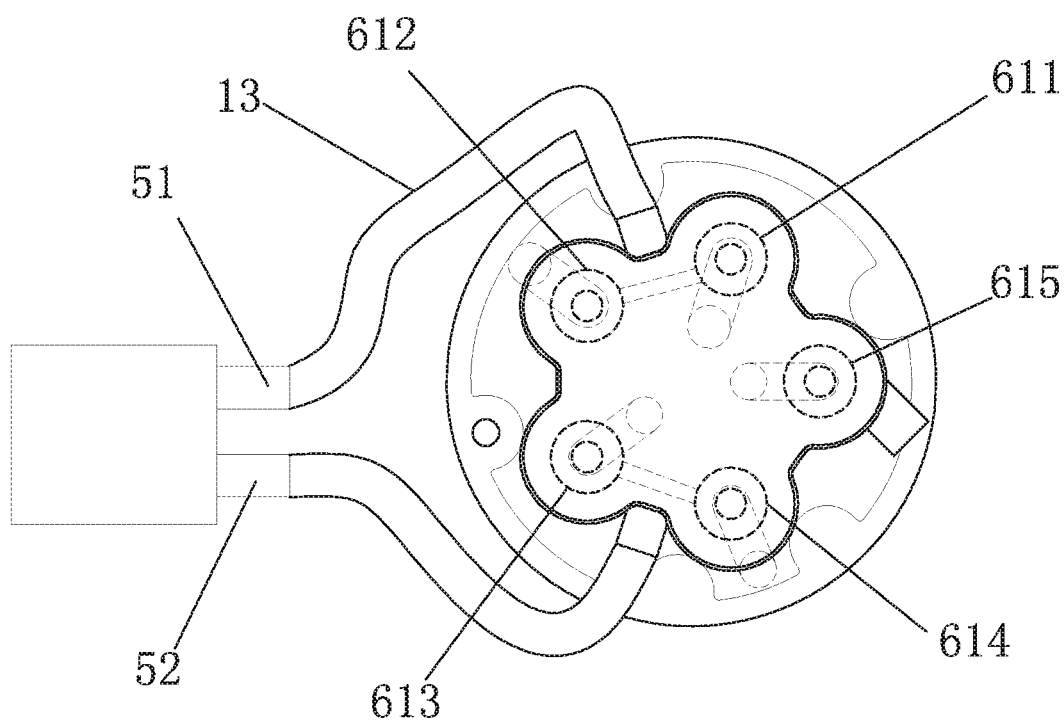
F I G. 13

ELECTRIC WINE DECANTER

BACKGROUND OF THE INVENTION

Field of the Invention

The present invention relates to a wine decanting device, and more particularly to an electric wine decanter.

Description of the Prior Art

Grape wines must decant and breathe to get a better taste. After decanted, the grape wine is fully in contact with the air to soften the bitter tannins of the grape wine so as to eliminate miscellaneous flavors and to give the fragrance of the grape wine. A traditional wine decanter is a glass container. In order to maximize the contact area between a red wine and the air, the bottom of the wine decanter is wider and the mouth of the container is smaller. It is required to wait for at least half an hour to achieve the decanting effect. This wine decanter is large and fragile, so it is inconvenient to carry or transport the wine decanter. The decanting effect is slow. The user needs to wait for a period of time to decant the wine.

Chinese Patent Application No. CN201510409229.5 discloses "an electric wine decanter". The electric wine decanter comprises an air tube communicated with an intake tube. The air in the air tube passes through the intake tube to enter the wine bottle. The air is fully in contact with the wine, so that the grape wine can be oxidized quickly. This electric wine decanter only provides a decanting function. Its function is single. Sometimes, people cannot finish a bottle of wine off one time. The unconsumed wine needs to be preserved in a sealed manner. This electric wine decanter doesn't have the function to preserve the unconsumed wine. Accordingly, the inventor of the present invention has devoted himself based on his many years of practical experiences to solve these problems.

SUMMARY OF THE INVENTION

In order to overcome the shortcomings of the prior art, the primary object of the present invention is to provide an electric wine decanter which can decant a wine quickly and preserve the wine in a vacuum manner and can be carried with ease.

According to one aspect of the present invention, an electric wine decanter is provided. The electric wine decanter comprises a housing, an air pump inside the housing, a spout located outside the housing, a retaining base located at a bottom of the housing for retaining the electric wine decanter onto the mouth of a wine container, and a control switch on the housing for controlling the operation of the electric wine decanter. The retaining base is provided with a vent hole for communicating with the air in the wine container and a wine guide tube for extending to a bottom of the wine container. The housing further includes a directional control valve therein for controlling an air flow switch of the air pump and a drive device for controlling the operation of the directional control valve. The directional control valve includes a valve body and a valve seat mounted to a bottom of the valve body. The valve body has a first valve chamber, a second valve chamber, a third valve chamber, a fourth valve chamber, and a fifth valve chamber. A first valve core is provided in the first valve chamber. A second valve core is provided in the second valve chamber. A third valve core is provided in the third valve chamber. A fourth valve core is provided in the fourth valve chamber. A fifth valve core is provided in the fifth valve chamber. The valve seat has a first valve mouth matching with the first valve core, a second valve mouth matching with the second valve core, a third valve mouth matching with the third valve core, a fourth valve mouth matching with the fourth valve core, and a fifth valve mouth matching with the fifth valve core. The first valve mouth is in communication with the vent hole of the retaining base. The second valve mouth is in communication with the outside air. The third valve mouth is in communication with the vent hole. The fourth valve mouth is in communication with the outside air. The fifth valve mouth is in communication with the wine guide tube. The valve body further has a first air hole communicating with an air pump outlet, a second air hole communicating with an air pump inlet, and a wine outlet connected with the spout. The drive device is fixedly connected with a synchronous operating assembly composed of the first valve core, the fourth valve core and the fifth valve core as well as another synchronous operating assembly composed of the second valve core and the third valve core, respectively. A wall of the wine guide tube is formed with a perforation. The perforation is located above a wine level when in use.

When the five valve cores seal the corresponding five valve mouths, the five valve chambers form sealed spaces. At this time, the electric wine decanter is in a pressure-holding state. When the second valve core opens the second valve mouth and the third valve core opens the third valve mouth, the first valve mouth, the fourth valve mouth, and the fifth valve mouth are still in a sealed state. Through the operation of the air pump, the electric wine decanter is in a vacuum state. When the first valve core opens the first valve mouth, the fourth valve core the fourth valve mouth, and the fifth valve core opens the fifth valve mouth, the second valve mouth and the third valve mouth are sealed. Through the operation of the air pump, the pressure difference between the wine container and the wine guide tube enables the perforation to spout the air toward the wine in the wine guide tube. The electric wine decanter is a decanting state for outputting the wine. It is only necessary to install the electric wine decanter of the present invention on the mouth of the wine container. By the opening and closing of the different valve mouths, the flow path of the air flow is changed to realize the functions of pressure-holding, vacuumizing and decanting. The electric wine decanter is compact, so it can be carried easily and conveniently. The electric wine decanter can pump the air in the wine container out when in a vacuum state, and then the electric wine decanter is in a pressure-holding state. This way prevents the wine from excessively contacting with the air to result in a deterioration of the wine, so that the wine can be preserved in a vacuum manner for a long time. The wine decanter can be always installed on the wine container before the wine is finished off. When the wine decanter is in a decanting state for outputting the wine, the outside air is fully guided into the wine container to decant the wine quickly. The time for decanting the wine is reduced from a few hours to five minutes. There is no need to pour the wine from one container into another and wait. The user can directly press the wine decanter to output the wine for drinking. The operation is easy and convenient. This way effectively reduces the bitter taste of the wine. People can quickly taste delicious wines.

Preferably, each of the valve cores includes a pull rod. The pull rod is sleeved with a spring. A top end of the pull rod penetrates the valve body and is fixedly connected to the drive device. A bottom end of the pull rod is insertedly connected to a sealing plug. The sealing plug leans against the spring. The sealing plug is matched with the valve mouths. The drive device includes a motor. An output shaft of the motor is connected with a gear transmission assembly. The gear transmission assembly is connected with a screw rod. The screw rod is connected with a connecting rod. A middle portion of the connecting rod is hingedly connected with a support rod. The support rod is fixed to the valve body. Two ends of the connecting rod are hingedly connected with a left pull rod and a right pull rod. The left pull rod is fixedly connected with the second valve core and the third valve core. The right pull rod is fixedly connected with the first valve core, the fourth valve core, and the fifth valve core.

Through the spring, the valve core can be restored in a closed state, thereby ensuring the operation of the valve core. The sealing plug is configured to open or close the valve mouth. The components can be employed universally, and it is convenient to replace the components. The drive device uses the gear transmission to improve the operational stability. Through screw rod, the rotary motion is converted into the linear motion. On the principle of a "seesaw" structure, the left and right pull rods are pulled up and down corresponding to the valve core to open or close the valve mouth. The structure design is very innovative.

Preferably, the connecting rod has a hollow cavity between the support rod and the right pull rod. A fulcrum nut is hinged in the hollow cavity. The fulcrum nut is interlinked with the screw rod. One end of the left pull rod is connected with a left lift board. The left lift board is fixedly connected with the pull rods of the second valve core and the third valve core. The left pull rod has a protrusion thereon. The left lift board is formed with a groove slidably mating with the protrusion. A pin is mounted on the left pull rod. The left lift board has a groove therein corresponding to the pin. One end of the right pull rod is connected with a right lift board. The right lift board is fixedly connected with the pull rods of the first valve core, the fourth valve core, and the fifth valve core. The right pull rod has another protrusion thereon. The right lift board is formed with another groove slidably mating with the protrusion of the right pull rod. Another pin is mounted on the right pull rod. The right lift board has another groove therein corresponding to the pin of the right pull rod. The left and right lift boards are provided with the pins and the grooves to form a buffer device, thereby effectively buffering the acting force of the drive device on the valve body.

Preferably, an upper end surface of the valve body is provided with a covering plate. The covering plate is provided with stepped holes corresponding in position to the five valve chambers of the valve body. A sealing sleeve is provided in each of the stepped holes. The pull rod is inserted through the sealing sleeve.

The sealing sleeve is used to seal the air pressure inside the valve chambers, effectively preventing the occurrence of leaks.

Preferably, a guide plate is mounted between the valve seat and the retaining base. The guide plate has a first misalignment hole, a second misalignment hole, a third misalignment hole, a fourth misalignment hole, and a fifth misalignment hole to communicate with the five valve mouths of the valve seat, respectively. The first misalignment hole communicates with the vent hole of the retaining base. The second misalignment hole communicates with the outside air. The third misalignment hole communicates with the vent hole. The fourth misalignment hole communicates with the outside air. The fifth misalignment hole communicates with the wine guide tube.

Through the misalignment holes of the guide plate, the lateral position of the corresponding valve mouth is adjusted toward the mouth of the wine container so as to be longitudinally aligned with the inside of the wine container. Compared to the connection of the guide tubes, this approach is more beneficial to reduce the size of the electric wine decanter and optimize the internal structure of the electric wine decanter.

Preferably, the perforation is a frustoconical structure which is gradually tapered inward.

The right-angled frustoconical perforation allows the air in the wine container to be spouted upwardly when entering the wine guide tube, so that the direction of the movement of the air and the wine to maintain the same. The wine can be fully in contact with the air to achieve the desired effect for decanting the wine.

Preferably, the retaining base is provided with at least one through hole to communicate with the outside air. The through hole is in communication with the second misalignment hole and the fourth misalignment hole, respectively.

Compared to the through hole disposed on the housing, the aforesaid structure is more reasonable and more pleasing to the eyes.

Preferably, the housing further includes a battery pack electrically connected with the motor and a charging device for charging the battery pack. The charging device has a charging port.

The implementation of charging is relatively more reasonable, more user-friendly, and more convenient to carry.

Preferably, a guide tube is connected between the first air hole and the air pump outlet, and another guide tube is connected between the second air hole and the air pump inlet.

The connecting way by means of the guide tube is convenient and easy for production.

BRIEF DESCRIPTION OF THE DRAWINGS

FIG. 12 is a schematic view showing a partial structure of the present invention in a pressure-holding state;

FIG. 13 is a schematic view showing the principle of the directional control valve of the present invention in a pressure-holding state;

DETAILED DESCRIPTION OF THE PREFERRED EMBODIMENTS

Embodiments of the present invention will now be described, by way of example only, with reference to the accompanying drawings.

Figure 1:
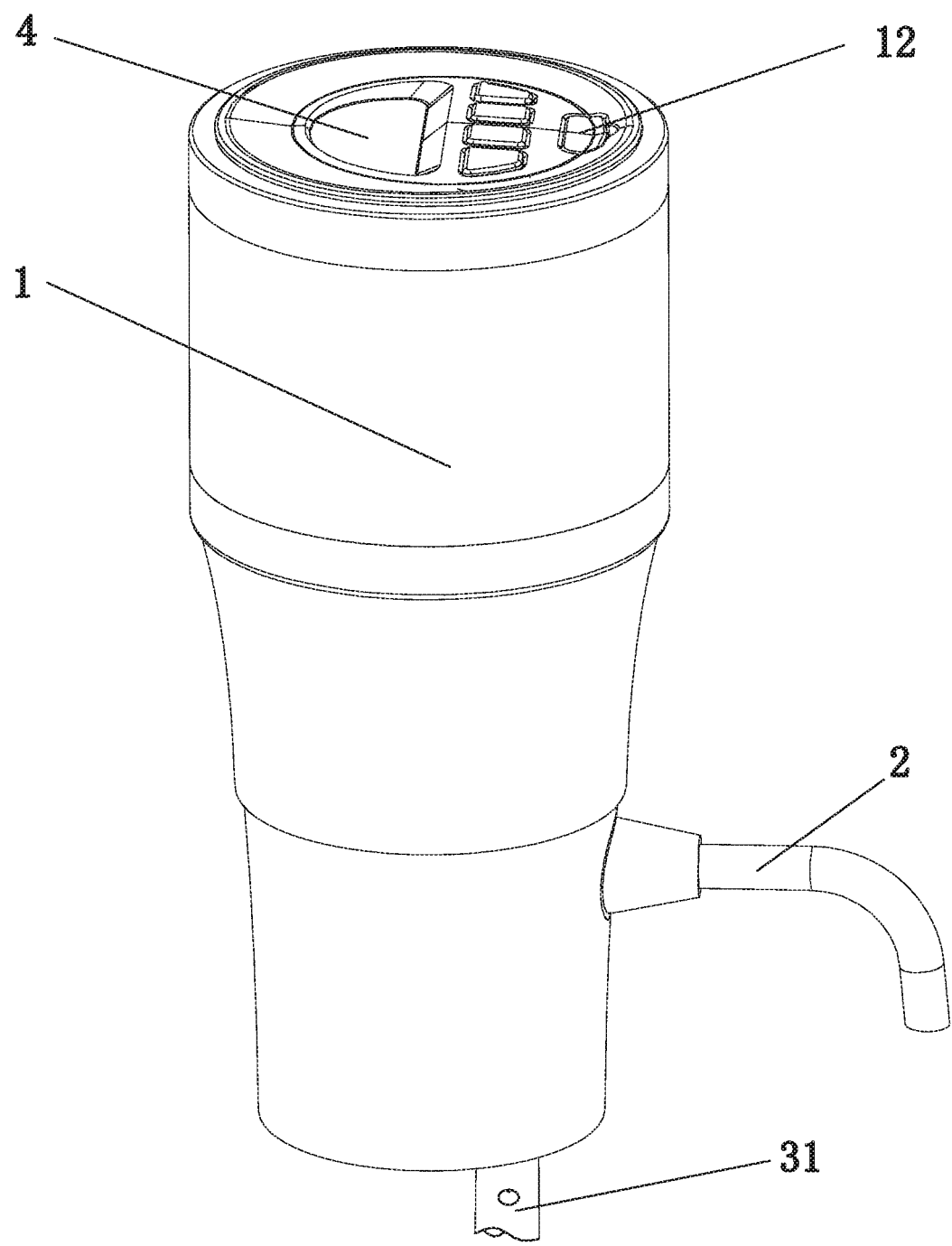
FIG. 1 is a schematic view showing the external structure of the present invention.
Figure 2:
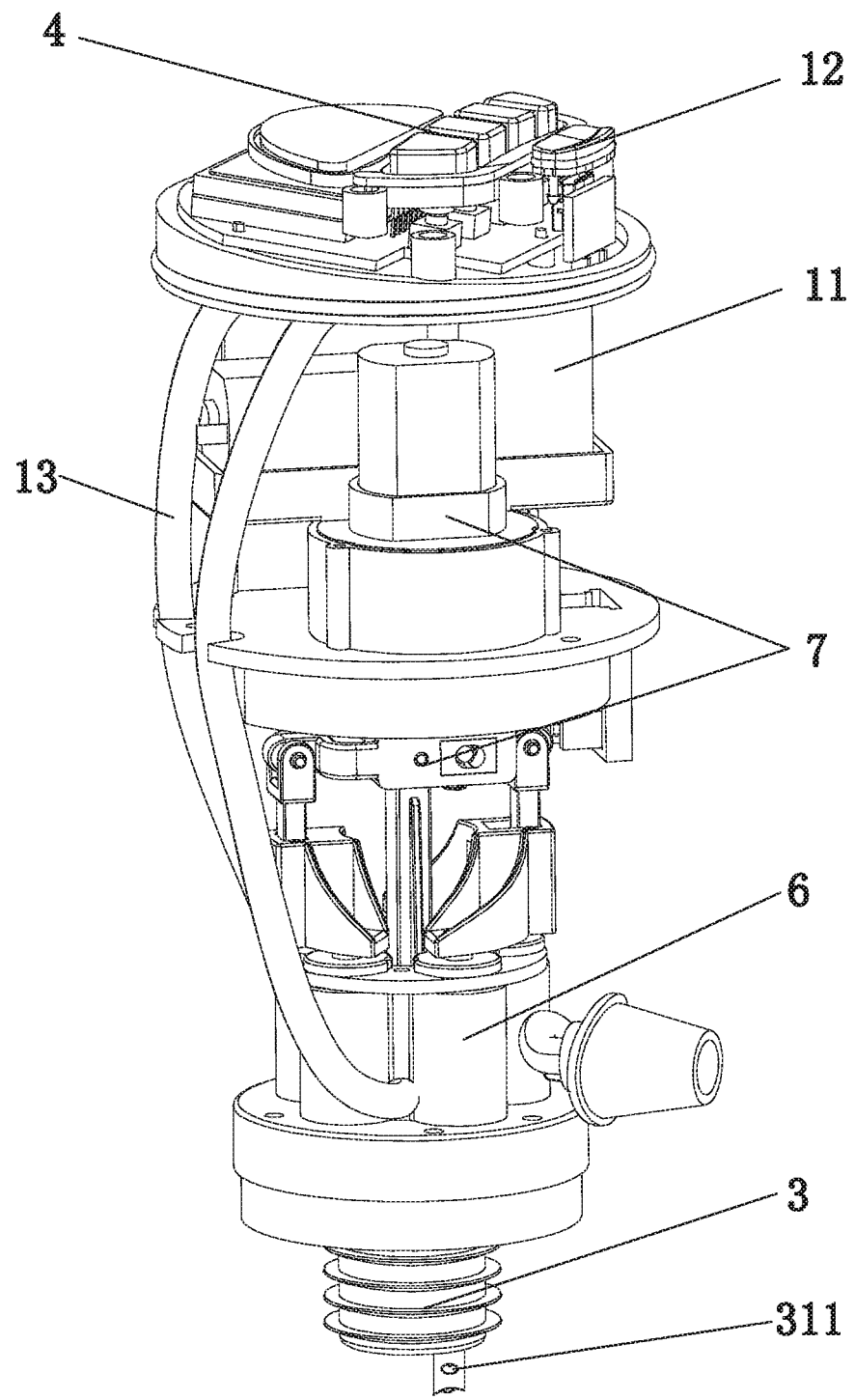
FIG. 2 is a schematic view showing the internal structure of the present invention.
Figure 3:
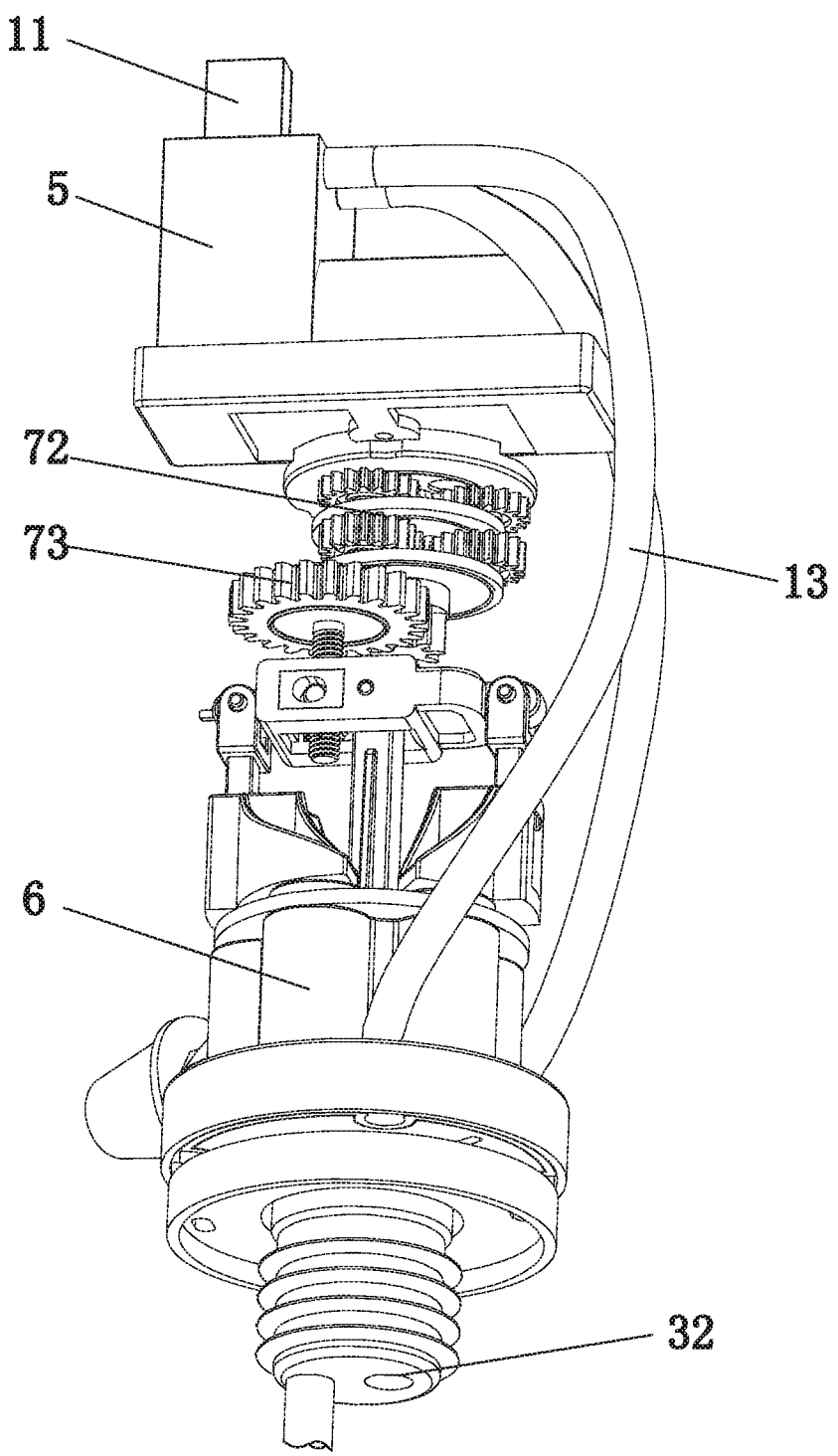
FIG. 3 is a schematic view showing a portion of the internal structure of the present invention.
Figure 4:
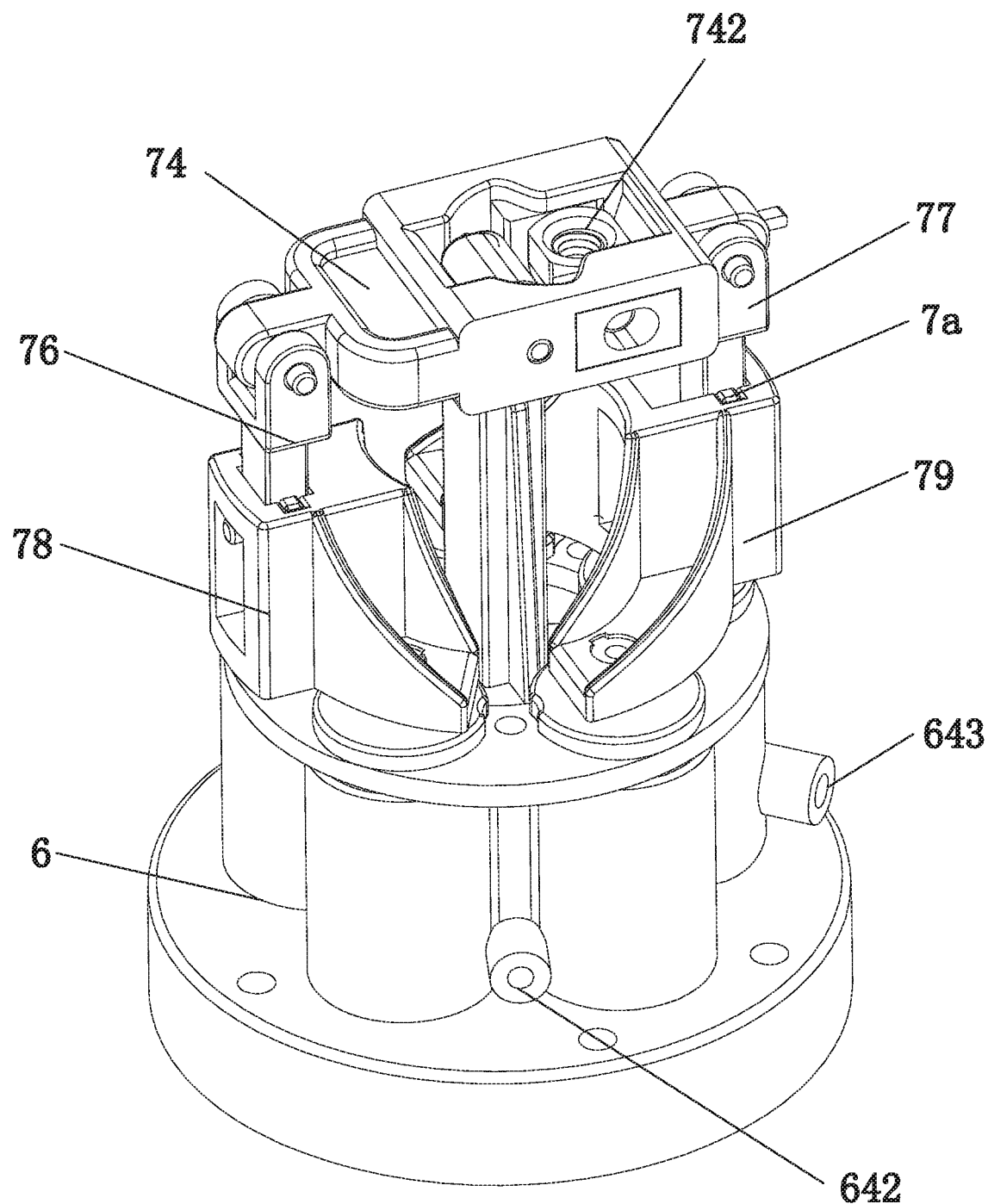
FIG. 4 is a schematic view showing a portion of the internal structure of the present invention.
Figure 5:
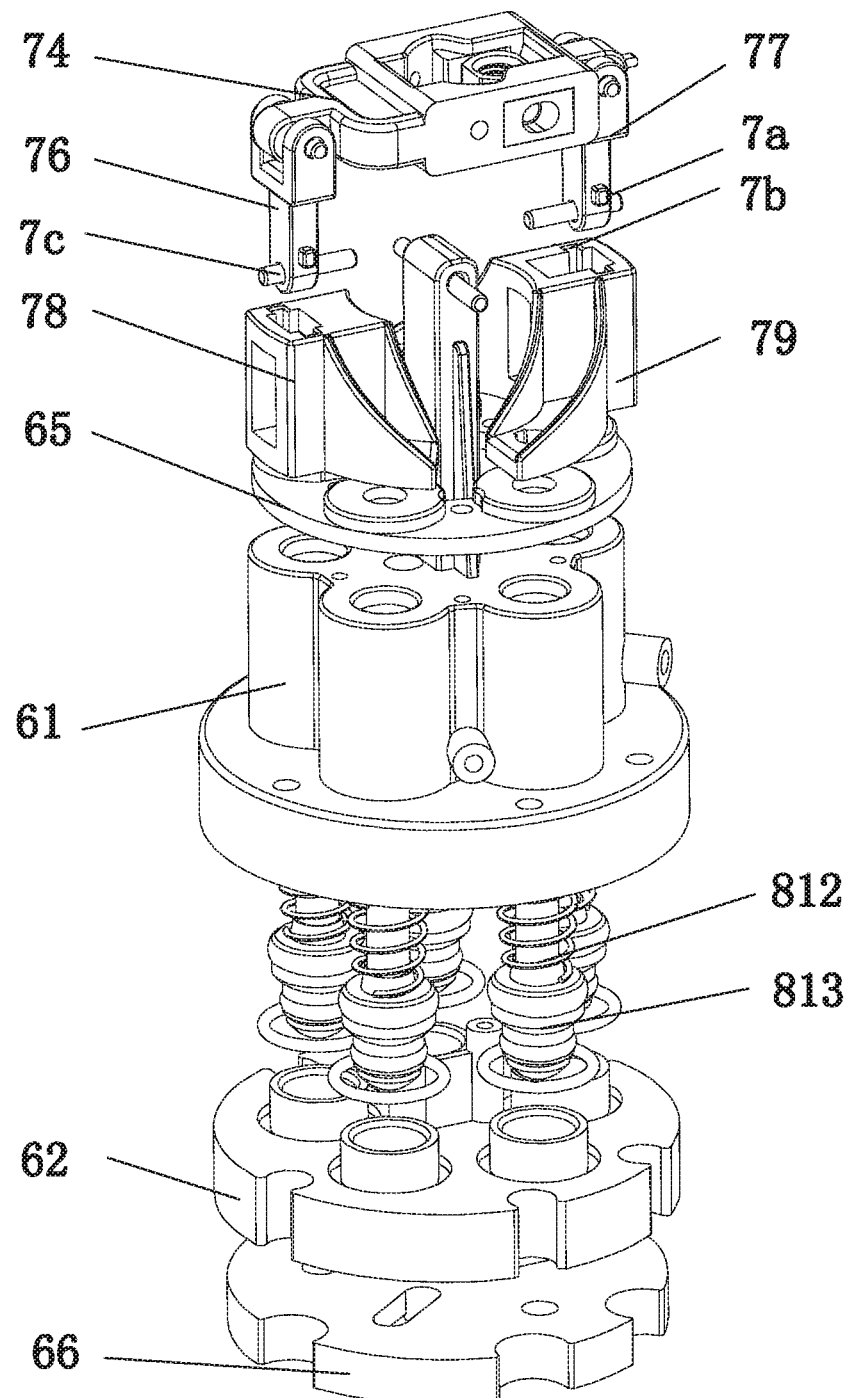
FIG. 5 is a schematic view showing a partial structure of the present invention.
Figure 6:
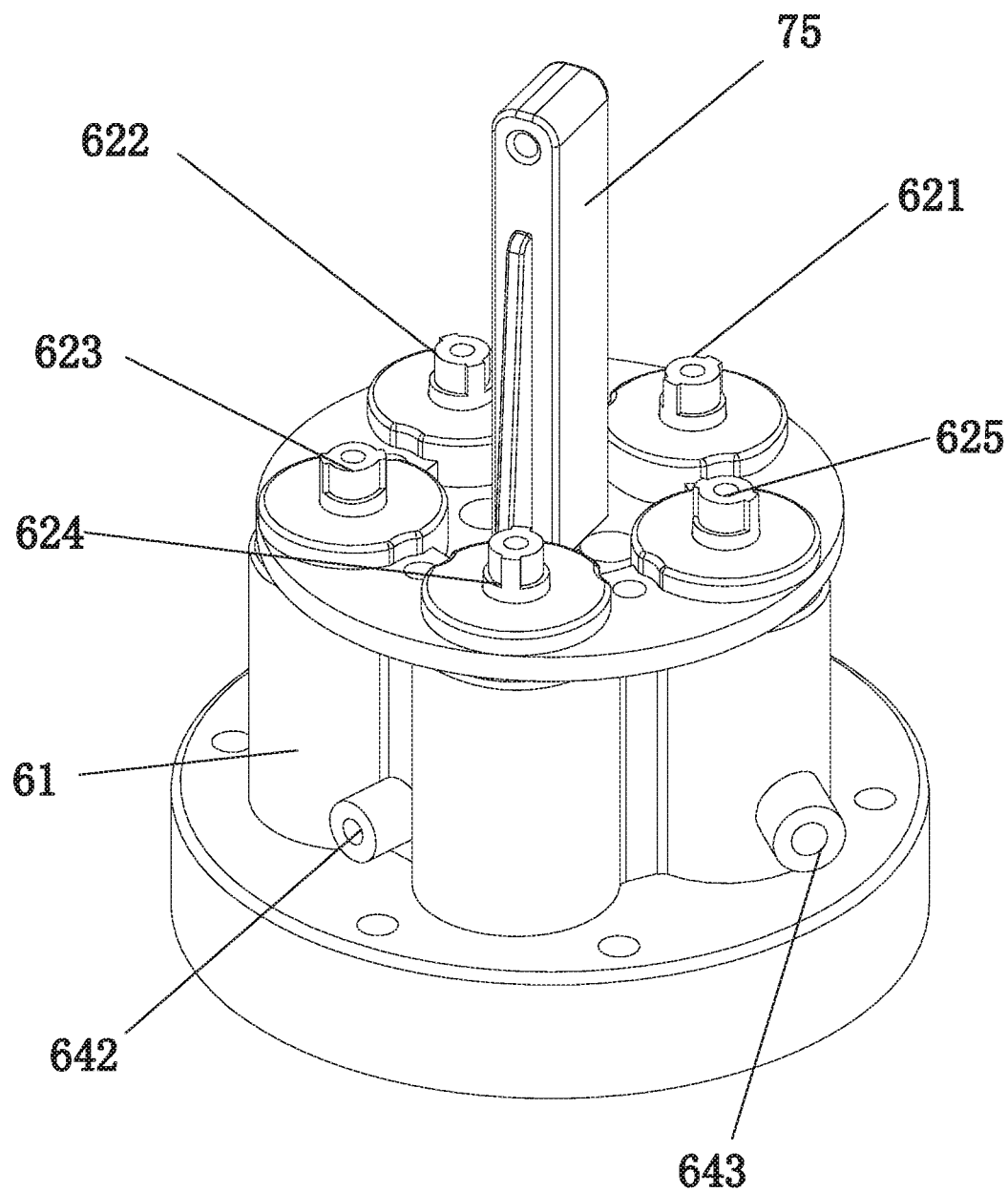
FIG. 6 is a schematic view showing the structure of the directional control valve of the present invention.
Figure 7:
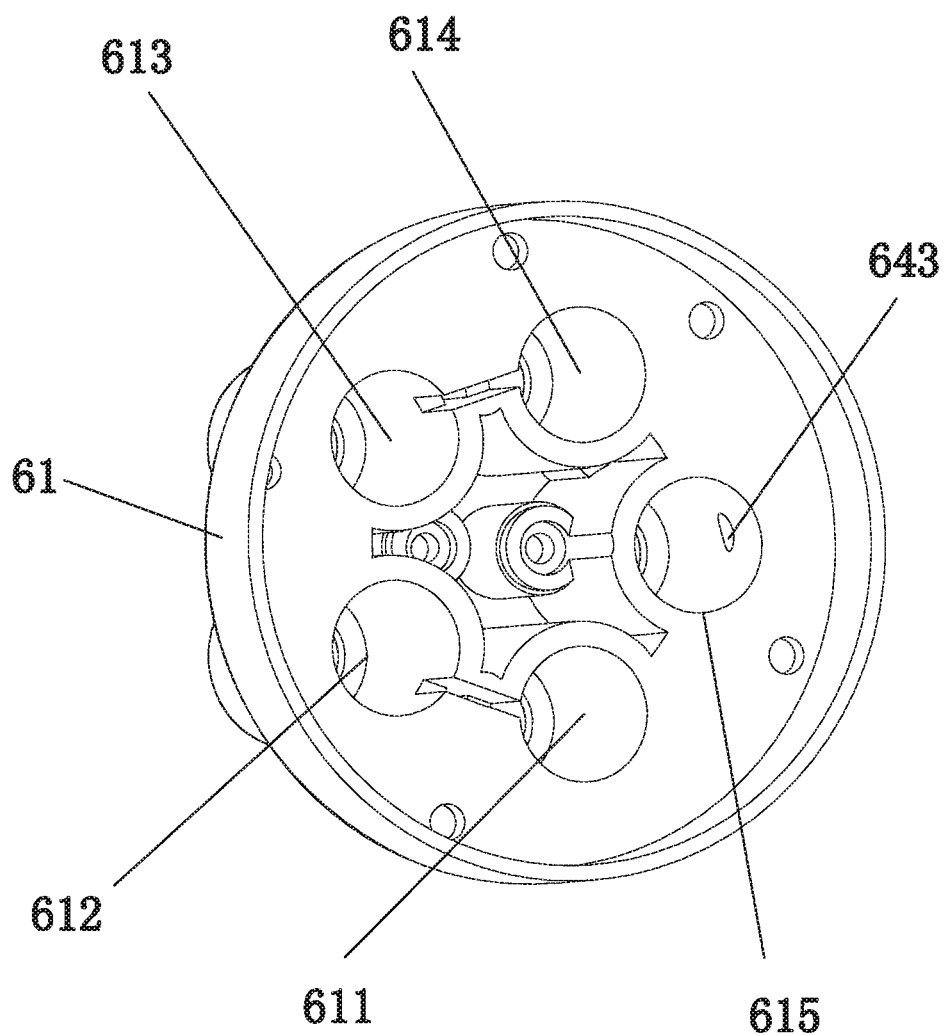
FIG. 7 is a schematic view showing the internal structure of the valve body of the present invention.
Figure 8:
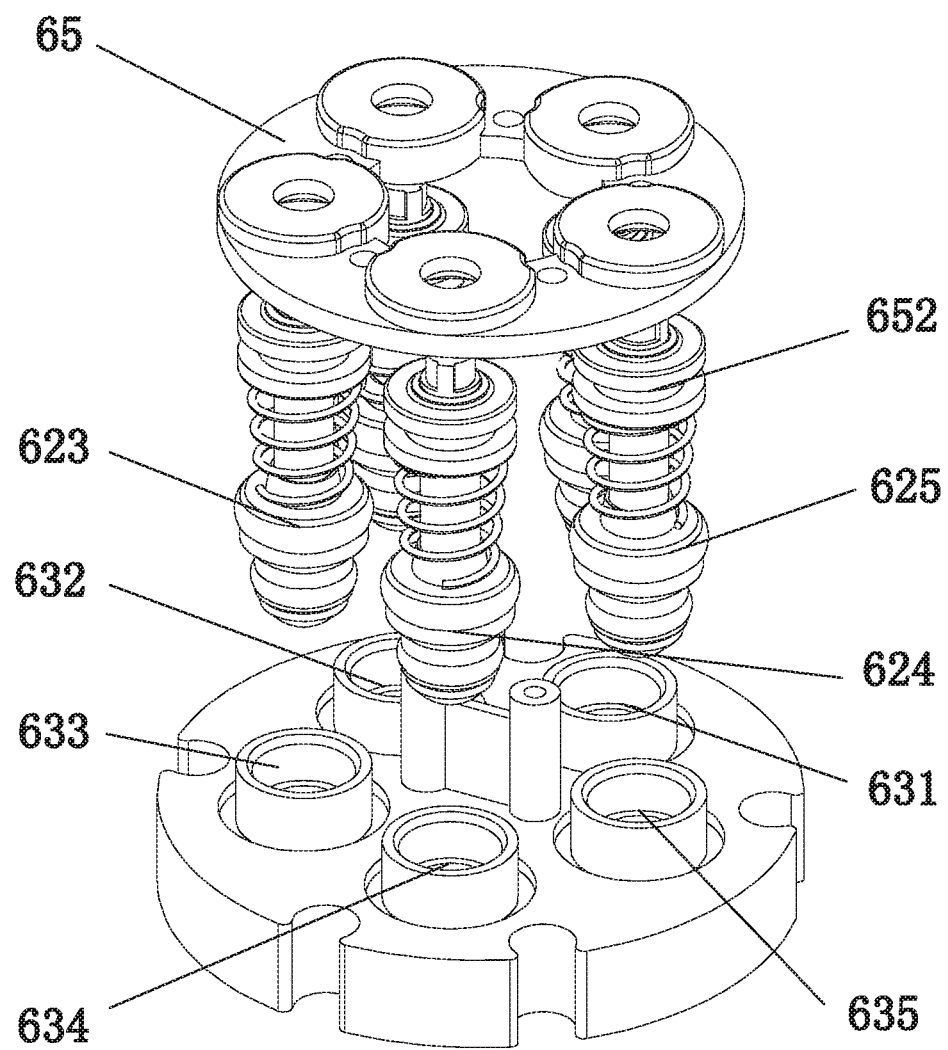
FIG. 8 is a schematic view showing the internal structure of the directional control valve of the present invention.
Figure 9:
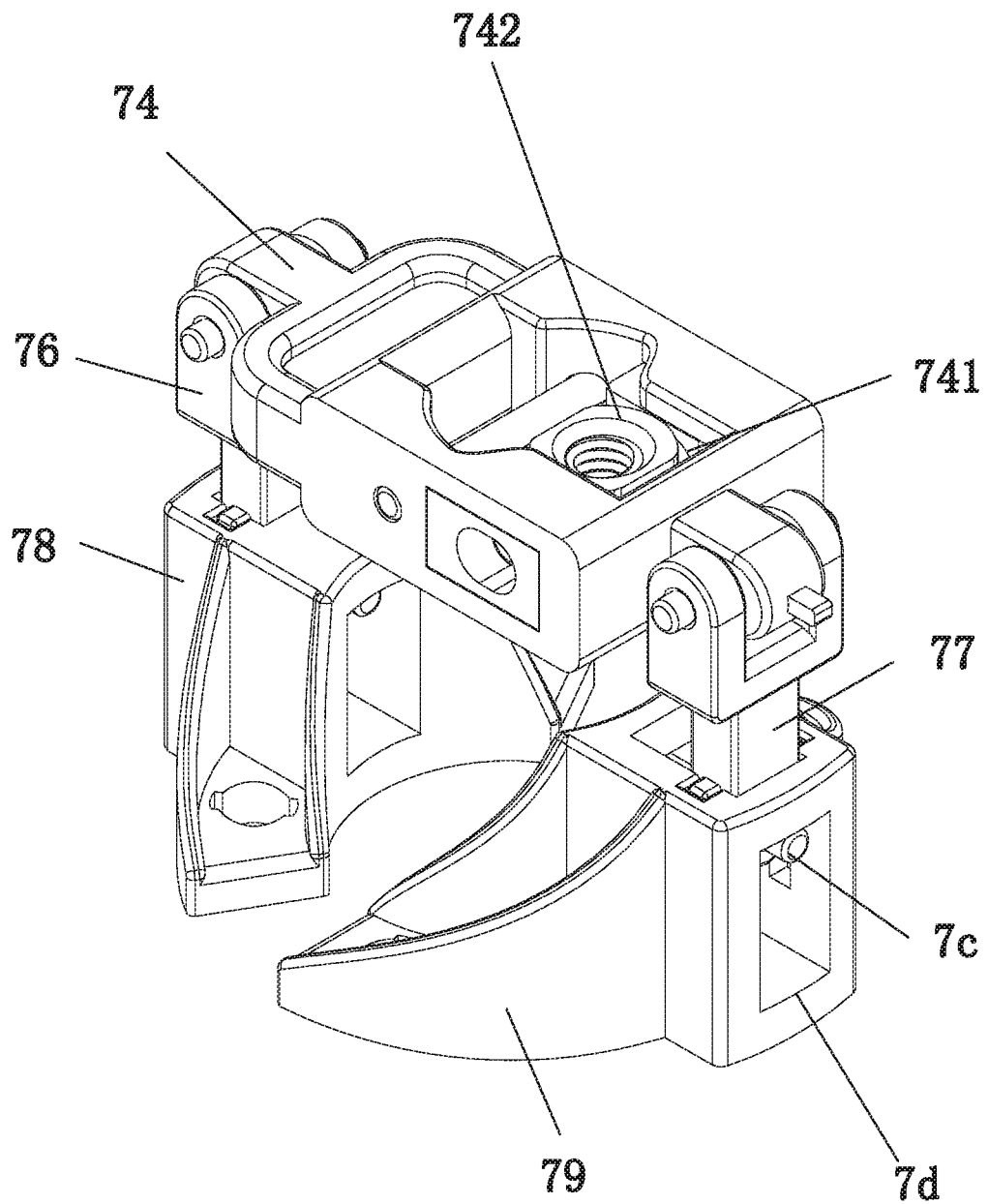
FIG. 9 is a schematic view showing a partial structure of the drive device of the present invention.
Figure 10:
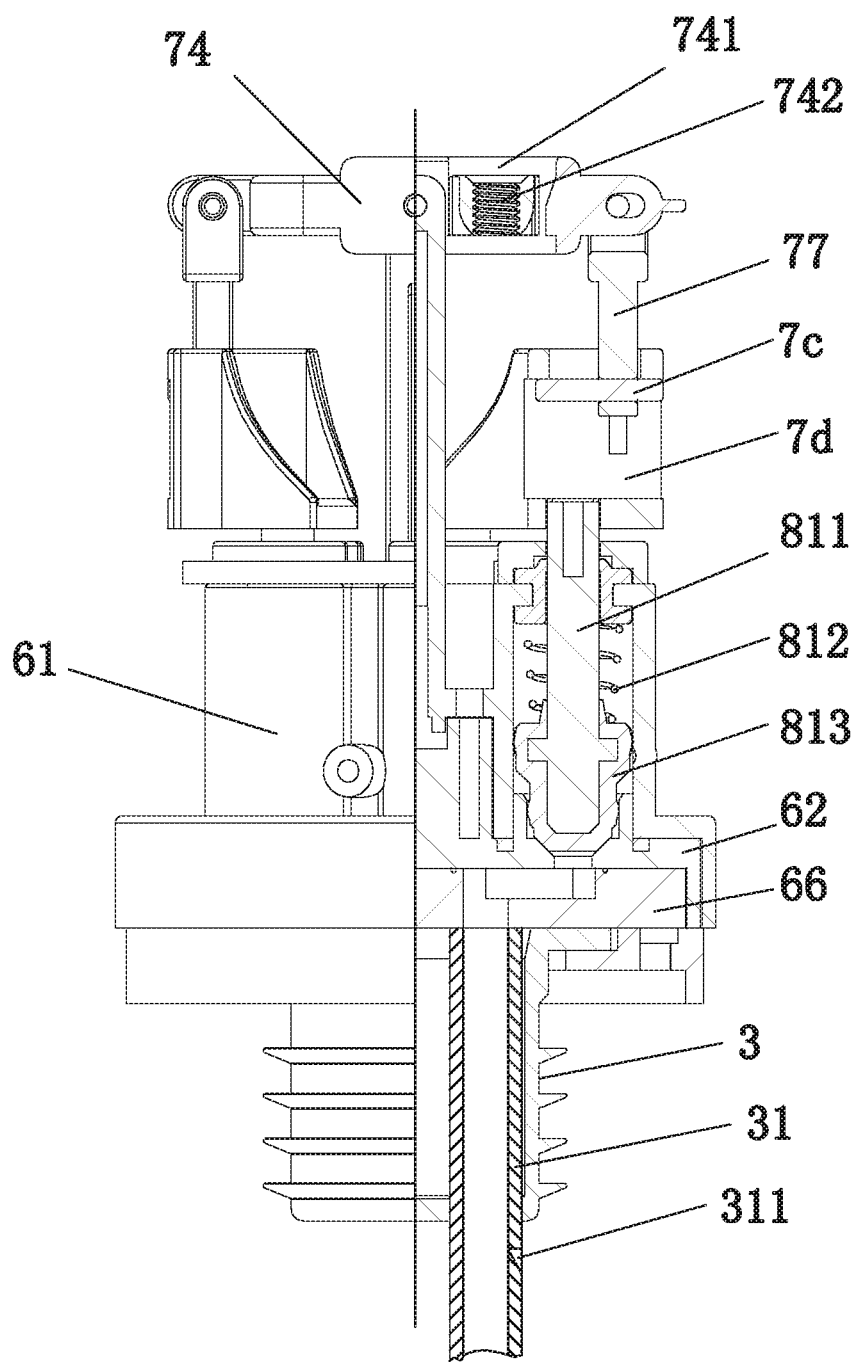
FIG. 10 is a sectional view showing a partial structure of the present invention.
Figure 15:
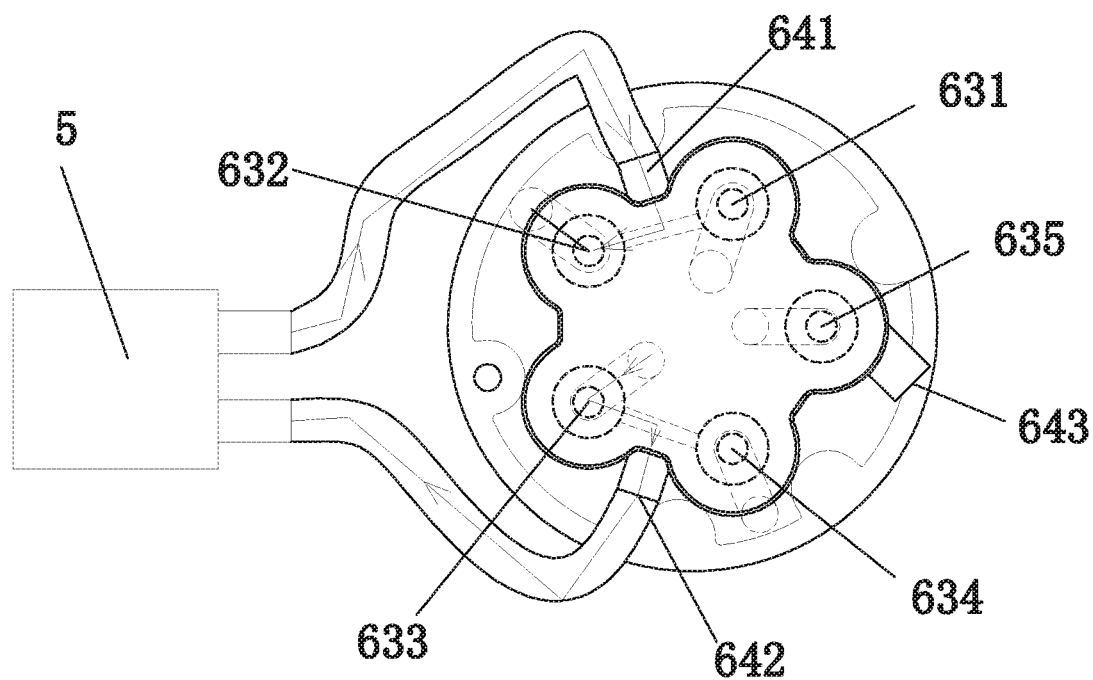
FIG. 15 is a schematic view showing the principle of the directional control valve of the present invention in a vacuumizing state.
Figure 16:
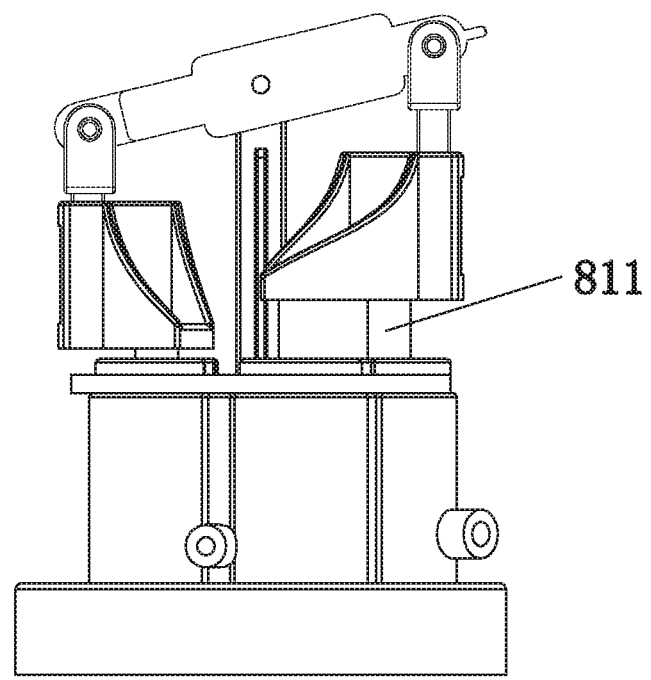
FIG. 16 is a schematic view showing a partial structure of the present invention in a decanting state.
Figure 17:
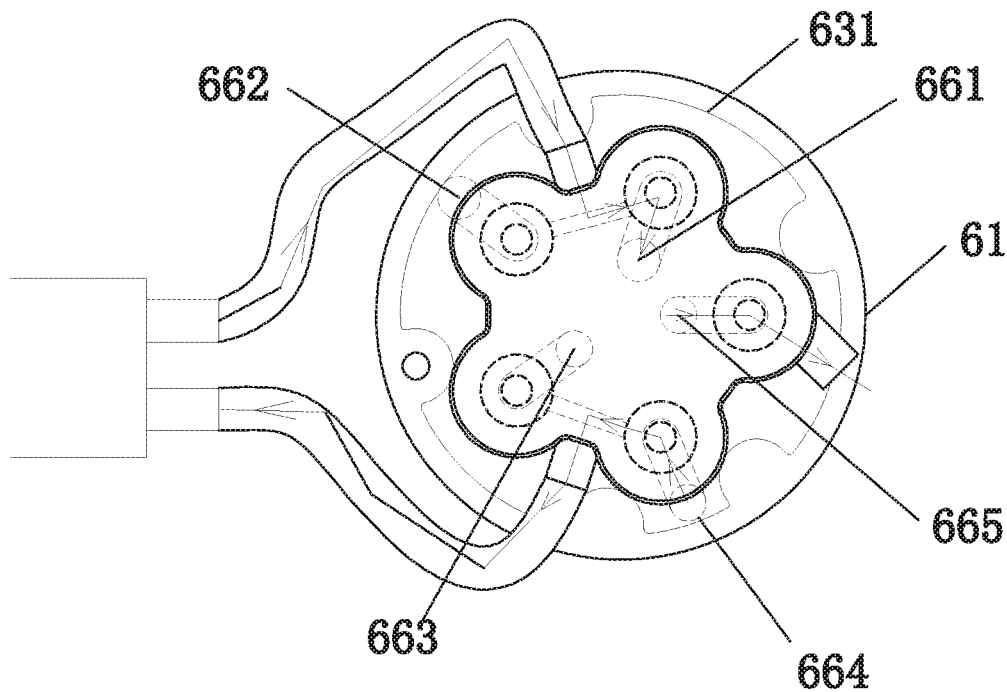
FIG. 17 is a schematic view showing the principle of the directional control valve of the present invention in a decanting state.

As shown in FIG. 1, an electric wine decanter according to a preferred embodiment of the present invention comprises a housing 1, an air pump 5 inside the housing 1, a spout 2 located outside the housing 1, a retaining base 3 located at the bottom of the housing 1 to retain the electric wine decanter onto the mouth of a wine container, and a control switch 4 on the housing 1 for controlling the operation of the electric wine decanter. The retaining base 3 is provided with a vent hole 32 for communicating with the air in the wine container and a wine guide tube 31 for extending to the bottom of the wine container. The inside of the housing 1 is provided with a directional control valve 6 for controlling the air flow switch of the air pump 5 and a drive device 7 for controlling the operation of the directional control valve 6. The directional control valve 6 includes a valve body 61 and a valve seat 62 mounted to the bottom of the valve body 61. The valve body 61 has a first valve clamber 611, a second valve chamber 612, a third valve chamber 613, a fourth valve chamber 614, and a fifth valve chamber 615. A first valve core 621 is provided in the first valve chamber 611. A second valve core 622 is provided in the second valve chamber 612. A third valve core 623 is provided in the third valve chamber 613. A fourth valve core 624 is provided in the fourth valve chamber 614. A fifth valve core 625 is provided in the fifth valve chamber 615. The valve seat 62 is provided with a first valve mouth 631 matching with the first valve core 621, a second valve mouth 632 matching with the second valve core 622, a third valve mouth 633 matching with the third valve core 623, a fourth valve mouth 634 matching with the fourth valve core 624, and a fifth valve mouth 635 matching with the fifth valve core 625. The first valve mouth 631 is in communication with the vent hole 32 of the retaining base 3. The second valve mouth 632 is in communication with the outside air. The third valve mouth 633 is in communication with the vent hole 32. The fourth valve mouth 634 is in communication with the outside air. The fifth valve mouth 635 is in communication with the wine guide tube 31. The valve body 61 is further provided with a first air hole 641 communicating with an air pump outlet 51, a second air hole 642 communicating with an air pump inlet 52, and a wine outlet 643 connected with the spout 2. The drive device 7 is fixedly connected with a synchronous operating assembly composed of the first valve core 621, the fourth valve core 624 and the fifth valve core 625 and another synchronous operating assembly composed of the second valve core 622 and the third valve core 623, respectively. The wall of the wine guide tube 31 is formed with a perforation 311 located above a wine level. When in use, the electric wine decanter is mounted onto the mouth of the wine container and the wine guide tube 31 is directly inserted to the bottom of the wine container. The wine guide tube 31 is made of a soft material and can be inserted to the bottom of the different height of the wine container. Through the control switch 4, the electric wine decanter can be controlled in different operating states, so that each of the valve mouths can be opened or closed to change the air flow and the wine flow inside the directional control valve 6, thereby achieving the functions of pressure-holding, vacuumizing, decanting wine and the like. As shown in FIG. 13, the five valve cores (621-625) seal the corresponding five valve mouths (631-635) so that the five valve chambers (611-615) form respective sealed spaces. At this time, the electric wine decanter is in a pressure-holding state to isolate the container pressure from the outside air. Under the premise that the retaining base 3 seals the wine container, the five valve mouths (631-635) are closed to isolate the air inside the wine container from the outside air. The container has its own air pressure. As shown in FIG. 15, the direction of the arrow is the direction of the air flow. When the second valve core 622 opens the second valve chamber 612, the second valve mouth 632 is in communication with the first air hole 641. When the third valve core 623 opens the third valve chamber 613, the third valve mouth 633 is in communication with the second air hole 642. The first valve mouth 631, the fourth valve mouth 634, and the fifth valve mouth 635 are still in a sealed state. Through the operation of the air pump 5, the air in the wine container passes through the vent hole 32, the third valve mouth 633, the third valve chamber 613, and the second air hole 642 to the air pump inlet 52. The air pump 5 expels the air from the first air hole 641 through the second valve chamber 613 and the second valve mouth 632 to the outside. The electric wine decanter is in a vacuum state. As shown in FIG. 17, the direction of the arrow is the direction of the air flow or the direction of the wine flow. When the first valve core 621 opens the first valve chamber 611, the first valve mouth 631 is in communication with the first air hole 641. When the fourth valve core 624 opens the fourth valve chamber 614, the fourth valve mouth 634 is in communication with the second air hole 642. When the fifth valve core 625 opens the fifth valve chamber 615, the fifth valve mouth 635 is in communication with the wine outlet 643. The second valve mouth 632 and the third valve mouth 633 are sealed. Through the operation of the air pump 5, the outside air passes through the fourth valve mouth 634, the fourth valve chamber 614, and the second air hole 642 to the air pump inlet 52. The outside air is drawn to pass through the first air hole 641, the first valve mouth 631, the first valve chamber 611, and the vent hole 32 to enter the wine container. The air in the wine container is pressurized. The wine in the wine container is discharged from the spout 2 through the wine guide tube 31 and the fifth valve mouth 635. The pressure difference between the wine container and the wine guide tube 31 enables the perforation 311 to spout the air toward the wine in the wine guide tube 31, and then the air is mixed with the wine. The electric wine decanter is a decanting state for outputting the wine.

Each of the valve cores includes a pull rod 811. The pull rod 811 is sleeved with a spring 812. A top end of the pull rod 811 penetrates the valve body 61 and is fixedly connected to the drive device 7. A bottom end of the pull rod 811 is insertedly connected to a sealing plug 813. The sealing plug 813 leans against the spring 812. The sealing plug 813 is matched with the valve mouth. The drive device 7 includes a motor 71. An output shaft of the motor 71 is connected with a gear transmission assembly 72. The gear transmission assembly 72 is connected with a screw rod 73.

The screw rod 73 is connected with a connecting rod 74. A middle portion of the connecting rod 74 is hingedly connected with a support rod 75. The support rod 75 is fixed to the valve body 61. Two ends of the connecting rod 74 are hingedly connected with a left pull rod 76 and a right pull rod 77. The left pull rod 76 is fixedly connected with the second valve core 622 and the third valve core 623. The right pull rod 77 is fixedly connected with the first valve core 621, the fourth valve core 624, and the fifth valve core 625. The sealing plug 813 biased by the spring 812 is moved to the valve mouth in a closed state. Through screw rod 73 of the drive device 7, the rotary motion is converted into the linear motion, and the connecting rod 74 is driven to move. On the principle of a "seesaw" structure, the left and right pull rods are lifted or lowered to open or close the corresponding valve core.

The connecting rod 74 has a hollow cavity 741 between the support rod 75 and the right pull rod 77. A fulcrum nut 742 is hingedly provided in the hollow cavity 741. The fulcrum nut 742 is interlinked with the screw rod 73. One end of the left pull rod 76 is connected with a left lift board 78. The left lift board 78 is fixedly connected with the pull rods 811 of the second valve core 622 and the third valve core 623. The left pull rod 76 has a protrusion 7a thereon. The left lift board 78 is formed with a groove 7b slidably mating with the protrusion 7a. A pin 7c is mounted on the left pull rod 76. The left lift board 78 has a groove 7d therein corresponding to the pin 7c. One end of the right pull rod 77 is connected with the right lift board 79. The right lift board 79 is fixedly connected with the pull rods 811 of the first valve core 621, the fourth valve core 624, and the fifth valve core 625. The right pull rod 77 has another protrusion 7a thereon. The right lift board 79 is formed with another groove 7b slidably mating with the protrusion 7a. Another pin 7c is mounted on the right pull rod 77. The right lift board 79 has another groove 7d therein corresponding to the pin 7c. When the screw rod 73 is rotated, the fulcrum nut 742 ascends to lift the left pull rod 76. The left pull rod 76 lifts the left lift board 78 through the pin 7c. The second valve core 622 and the third valve core 623 are opened corresponding to the respective valve mouths. The right pull rod 77 is lowered. The protrusion 7a of the right lift board 79 slides along the groove 7b while the pin 7c is slid down in the groove 7d, not acting on the right lift board 79. Similarly, when the screw rod 73 is rotated reversely, the fulcrum nut 742 ascends to lift the right pull rod 77. The left pull rod 76 descends, and the right lift board 79 connected with the right pull rod 77 is lifted. The first valve core 621, the fourth valve core 624 and the fifth valve core 625 are opened corresponding to the respective valve mouths.

An upper end surface of the valve body 61 is provided with a covering plate 65. The covering plate 65 is provided with stepped holes 651 corresponding in position to the five valve chambers of the valve body 61. A sealing sleeve 652 is provided in each of the stepped holes 651. The pull rod 811 is inserted through the sealing sleeve 652. The sealing sleeve 652 is disposed at the junction of the pull rod 811 and the valve body 61. The covering plate 65 is configured to fix and position the sealing sleeve 652.

Figure 11:
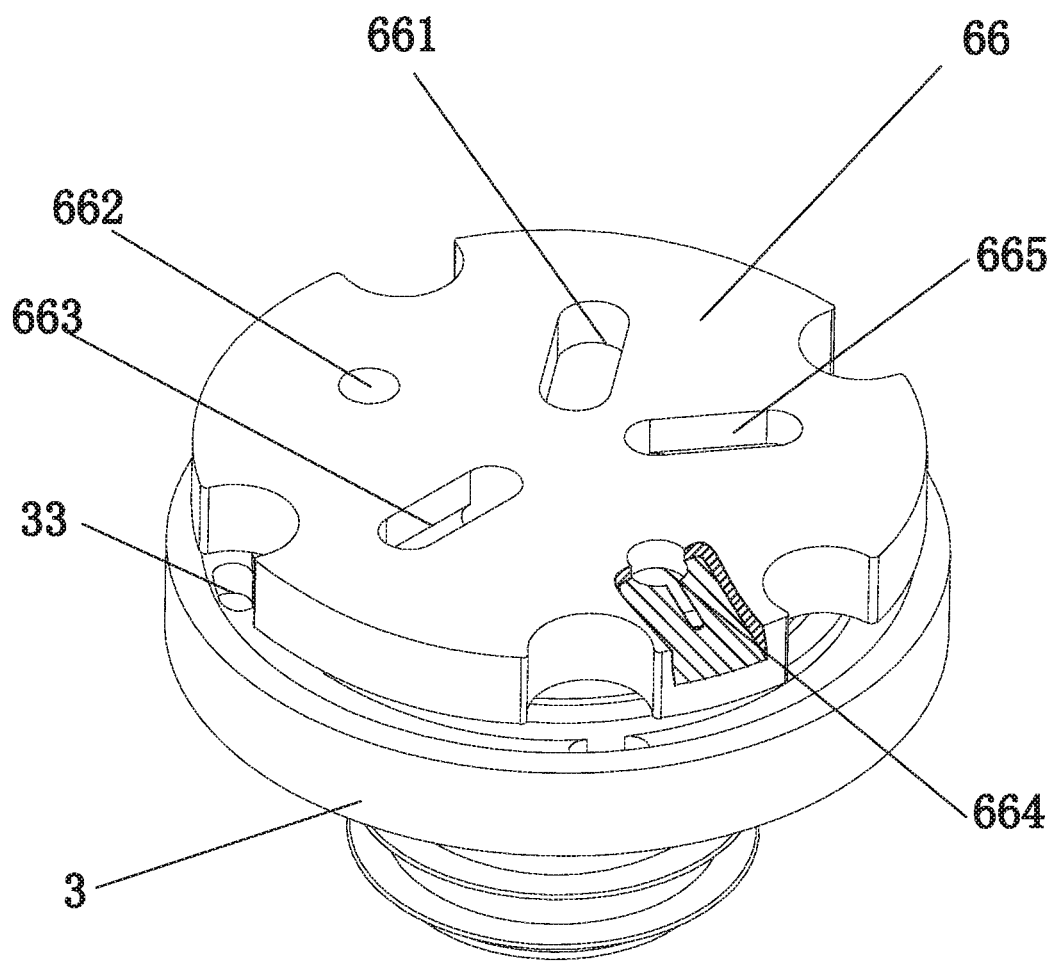
FIG. 11 is a schematic view showing the structure of the guide plate of the present invention.
Figure 14:
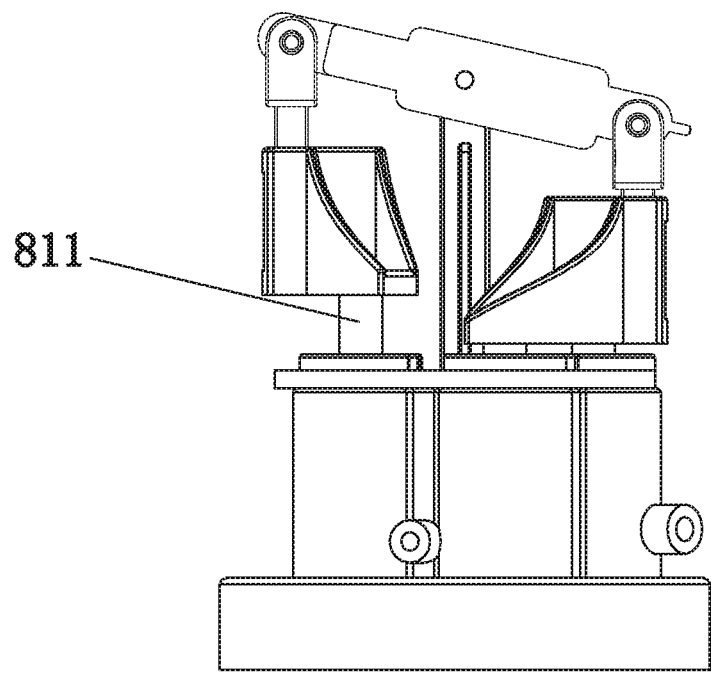
FIG. 14 is a schematic view showing a partial structure of the present invention in a vacuumizing state.

As shown in FIG. 11, a guide plate 66 is mounted between the valve seat 62 and the retaining base 3. The guide plate 66 has a first misalignment hole 661, a second misalignment hole 662, a third misalignment hole 663, a fourth misalignment hole 664, and a fifth misalignment hole 665 to communicate with the five valve mouths of the valve seat, respectively. The first misalignment hole 661 communicates with the vent hole 32 of the retaining base 3. The second misalignment hole 662 communicates with the outside air. The third misalignment hole 663 communicates with the vent hole 32. The fourth misalignment hole 664 communicates with the outside air. The fifth misalignment hole 665 communicates with the wine guide tube 31. Through the misalignment holes of the guide plate 66, the lateral position of the corresponding valve mouth is adjusted toward the mouth of the wine container so as to be longitudinally aligned with the inside of the wine container.

The perforation 311 is a right-angled frustoconical structure which is gradually tapered inward. The right-angled frustoconical perforation 311 allows the air to be spouted upwardly in the wine guide tube 31.

The retaining base 3 is provided with two through holes 33 to communicate with the outside air. The through holes 33 are in communication with the second misalignment hole 662 and the fourth misalignment hole 664, respectively. The retaining base 3 may be provided with an annular groove for communication of the two through holes.

The inside of the housing 1 is provided with a battery pack 11 electrically connected with the motor and a charging device for charging the battery pack. The charging device has a charging port 12 which is convenient for the electric wine decanter to be charged, without the need to replace the battery pack.

A guide tube 13 is connected between the first air hole 641 and the air pump outlet 51. Another guide tube 13 is connected between the second air hole 642 and the air pump inlet 52.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An electric wine decanter, comprising a housing, an air pump inside the housing, a spout located outside the housing, a retaining base located at a bottom of the housing for retaining the electric wine decanter onto a mouth of a wine container, and a control switch on the housing for controlling an operation of the electric wine decanter, the retaining base being provided with a vent hole for communicating with air in the wine container and a wine guide tube for extending to a bottom of the wine container, characterized in that: the housing further includes a directional control valve therein for controlling an air flow switch of the air pump and a drive device for controlling an operation of the directional control valve; the directional control valve includes a valve body and a valve seat mounted to a bottom of the valve body, the valve body has a first valve chamber, a second valve chamber, a third valve chamber, a fourth valve chamber, and a fifth valve chamber, a first valve core is provided in the first valve chamber, a second valve core is provided in the second valve chamber, a third valve core is provided in the third valve chamber, a fourth valve core is provided in the fourth valve chamber, a fifth valve core is provided in the fifth valve chamber, the valve seat has a first valve mouth matching with the first valve core, a second valve mouth matching with the second valve core, a third valve mouth matching with the third valve core, a fourth valve mouth matching with the fourth valve core, and a fifth valve mouth matching with the fifth valve core, the first valve mouth is in communication with the vent hole of the retaining base, the second valve mouth is in communication with outside air, the third valve mouth is in communication with the vent hole, the fourth valve mouth is in communication with the outside air, the fifth valve mouth is in communication with the wine guide tube, the valve body further has a first air hole communicating with an air pump outlet, a second air hole communicating with an air pump inlet, and a wine outlet connected with the spout; the first air hole is in communication with the first valve chamber and the second chamber respectively, the second air hole is in communication with the third valve chamber and the fourth camber respectively, the wine outlet is in communication with the fifth valve chamber; the drive device is fixedly connected with a synchronous operating assembly composed of the first valve core, the fourth valve core and the fifth valve core and another synchronous operating assembly composed of the second valve core and the third valve core, respectively; and a wall of the wine guide tube is formed with a perforation.

2. The electric wine decanter as claimed in claim 1, wherein each of the valve cores includes a pull rod, the pull rod is sleeved with a spring, a top end of the pull rod penetrates the valve body and is fixedly connected to the drive device, a bottom end of the pull rod is insertedly connected to a sealing plug, the sealing plug leans against the spring, the sealing plug is matched with the valve mouths; the drive device includes a motor, an output shaft of the motor is connected with a gear transmission assembly, the gear transmission assembly is connected with a screw rod, the screw rod is connected with a connecting rod, a middle portion of the connecting rod is hingedly connected with a support rod, the support rod is fixed to the valve body, two ends of the connecting rod are hingedly connected with a left pull rod and a right pull rod, the left pull rod is fixedly connected with the second valve core and the third valve core, and the right pull rod is fixedly connected with the first valve core, the fourth valve core, and the fifth valve core.

3. The electric wine decanter as claimed in claim 2, wherein the connecting rod has a hollow cavity between the support rod and the right pull rod, a fulcrum nut is hinged in the hollow cavity, the fulcrum nut is interlinked with the screw rod; one end of the left pull rod is connected with a left lift board, the left lift board is fixedly connected with the pull rods of the second valve core and the third valve core, the left pull rod has a protrusion thereon, the left lift board is formed with a groove slidably mating with the protrusion, a pin is mounted on the left pull rod, the left lift board has a groove therein corresponding to the pin; one end of the right pull rod is connected with a right lift board, the right lift board is fixedly connected with the pull rods of the first valve core, the fourth valve core, and the fifth valve core, the right pull rod has another protrusion thereon, the right lift board is formed with another groove slidably mating with the protrusion of the right pull rod, another pin is mounted on the right pull rod, and the right lift board has another groove therein corresponding to the pin of the right pull rod.

4. The electric wine decanter as claimed in claim 2, wherein an upper end surface of the valve body is provided with a covering plate, the covering plate is provided with stepped holes corresponding in position to the five valve chambers of the valve body, a sealing sleeve is provided in each of the stepped holes, and the pull rod is inserted through the sealing sleeve.

5. The electric wine decanter as claimed in claim 2, wherein a guide plate is mounted between the valve seat and the retaining base, the guide plate has a first misalignment hole, a second misalignment hole, a third misalignment hole, a fourth misalignment hole, and a fifth misalignment hole to communicate with the five valve mouths of the valve seat respectively, the first misalignment hole communicates with the vent hole of the retaining base, the second misalignment hole communicates with the outside air, the third misalignment hole communicates with the vent hole, the fourth misalignment hole communicates with the outside air, and the fifth misalignment hole communicates with the wine guide tube.

6. The electric wine decanter as claimed in claim 5, wherein the retaining base is provided with at least one through hole to communicate with the outside air, and the through hole is in communication with the second misalignment hole and the fourth misalignment hole, respectively.

7. The electric wine decanter as claimed in claim 2, wherein the housing further includes a battery pack electrically connected with the motor and a charging device for charging the battery pack, and the charging device has a charging port.

8. The electric wine decanter as claimed in claim 1, wherein a guide plate is mounted between the valve seat and the retaining base, the guide plate has a first misalignment hole, a second misalignment hole, a third misalignment hole, a fourth misalignment hole, and a fifth misalignment hole to communicate with the five valve mouths of the valve seat respectively, the first misalignment hole communicates with the vent hole of the retaining base, the second misalignment hole communicates with the outside air, the third misalignment hole communicates with the vent hole, the fourth misalignment hole communicates with the outside air, and the fifth misalignment hole communicates with the wine guide tube.

9. The electric wine decanter as claimed in claim 8, wherein the retaining base is provided with at least one through hole to communicate with the outside air, and the through hole is in communication with the second misalignment hole and the fourth misalignment hole, respectively.

10. The electric wine decanter as claimed in claim 1, wherein the perforation is a frustoconical structure which is gradually tapered inward.

11. The electric wine decanter as claimed in claim 1, wherein the housing further includes a battery pack electrically connected with the motor and a charging device for charging the battery pack, and the charging device has a charging port.

12. The electric wine decanter as claimed in claim 1, wherein a guide tube is connected between the first air hole and the air pump outlet, and another guide tube is connected between the second air hole and the air pump inlet.

* * * * *